Dec. 4, 1956   R. M. HARDGROVE   2,772,645
FUEL AND AIR CONTROL DAMPER FOR CYCLONE FURNACES
Filed May 22, 1952   2 Sheets-Sheet 1

INVENTOR.
Ralph M. Hardgrove
BY
J. P. Moran
ATTORNEY

Dec. 4, 1956   R. M. HARDGROVE   2,772,645
FUEL AND AIR CONTROL DAMPER FOR CYCLONE FURNACES
Filed May 22, 1952   2 Sheets-Sheet 2
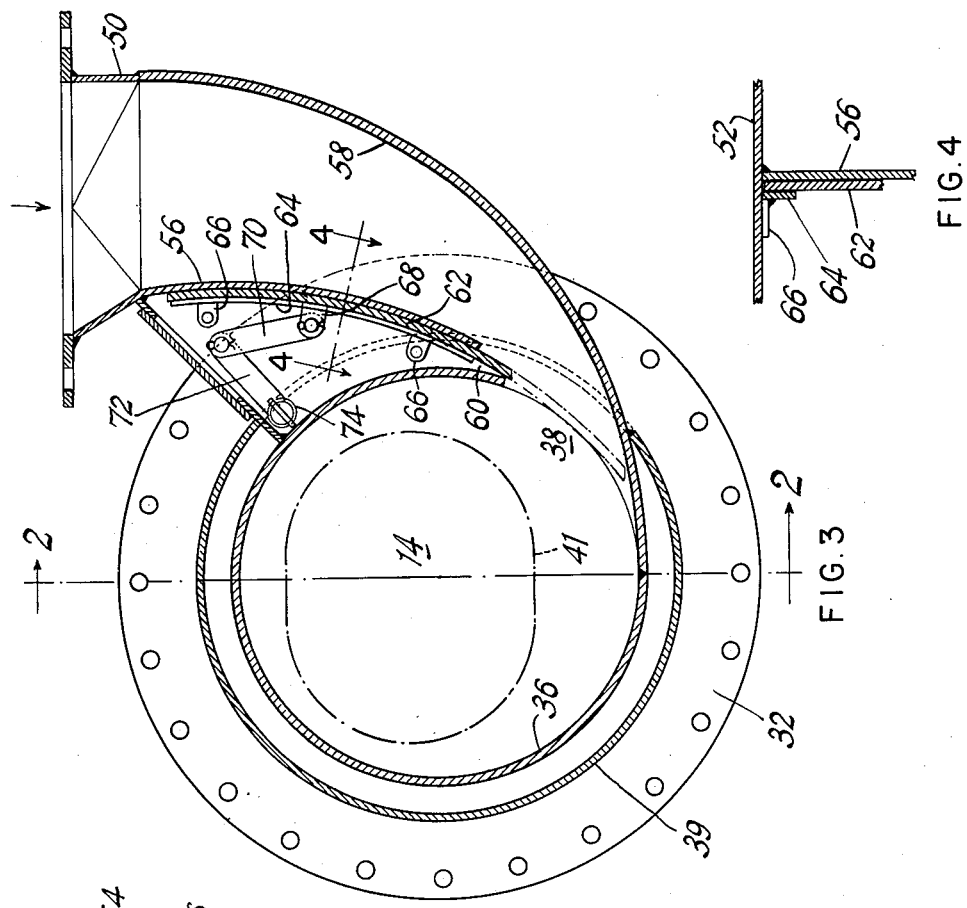
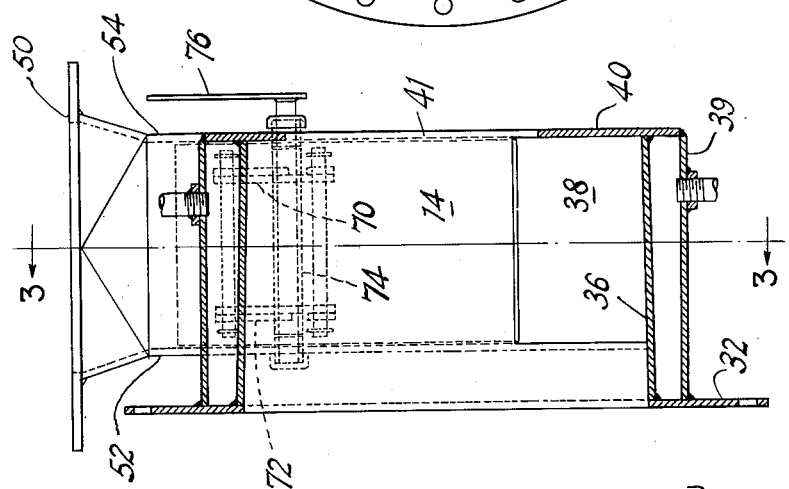
INVENTOR.
Ralph M. Hardgrove
BY
*J. J. Moran*
ATTORNEY United States Patent Office 2,772,645
Patented Dec. 4, 1956

2,772,645

FUEL AND AIR CONTROL DAMPER FOR CYCLONE FURNACES

Ralph M. Hardgrove, North Canton, Ohio, assignor to The Babcock & Wilcox Company, New York, N. Y., a corporation of New Jersey Application May 22, 1952, Serial No. 289,377

5 Claims. (Cl. 110—28)

The present invention relates to improvements in the construction and operation of fuel supply provisions for fuel burning equipment, and more particularly, to such provisions for a fuel burning unit of the cyclone type having a furnace especially adapted for the burning of ash-containing solid fuel in a coarsely pulverized or "granular" form and under conditions which result in furnace temperatures above the ash fusing temperature, whereby the residual ash can be removed from the furnace as a molten slag. The "granular" fuels normally used in such furnaces have particle sizes of ⅜" and under, and as a result of the fuel crushing operation, contain a proportion of dustlike fine particles. A cyclone furnace of the character described is disclosed in U. S. Patent No. 2,594,312.

As customarily constructed, a cyclone type furnace is of circular cross-section and horizontally arranged, and comprises a furnace chamber through which the burning fuel and air are caused to move in a substantially helical path along the circumferential wall on being discharged in a high velocity whirling stream from a fuel inlet chamber. The fuel to be burned is introduced into the fuel inlet chamber tangentially in a high velocity stream of primary air carrying the solid fuel particles in suspension. The major portion fo the combustion air is supplied as preheated secondary air through a tangentially arranged secondary air inlet extending lengthwise of the furnace chamber. A whirling stream of preheated teritiary air may also be supplied to the fuel inlet chamber from an adjoining chamber and introduced axially of the primary air-fuel stream.

As disclosed in said Patent No. 2,594,312 the stream of primary air and granular fuel is introduced into the lower side of the fuel inlet chamber through a tangentially arranged involute curved primary air-fuel conduit of substantially rectangular cross-section and the outer or lower wall of which connects to the peripheral wall of the fuel inlet chamber without any abrupt change in direction, to thereby minimize the friction losses and reduce abrasion on the peripheral wall of the fuel inlet chamber. The primary air-fuel pipe tapers in width towards its fuel inlet chamber end, and its effective flow area and thereby the velocity of the entering fuel-air stream is usually controlled by a manually operated curved control damper hinged along the inner side of the conduit and shaped to maintain the entering stream of primary air and granular fuel distributed along the peripheral wall of the fuel inlet chamber. A helical motion is imparted to the coal-air stream by the fuel inlet chamber. The whirling stream moves axially of the furnace in a helical path along the circular slag covered furnace wall. It has been found that when such a hinged control damper is moved about its pivot axis to positions in which it has a throttling effect on the entering primary air-fuel stream, that an eddy current tends to be set up in the resulting space at the chamber side of the damper due to the change in configuration of the inner wall inherently effected in the primary air-fuel supply conduit.

In accordance with the present invention, an improved control damper construction and arrangement is provided for controlling the discharge from the primary air-fuel supply conduit to a fuel inlet chamber of the character described which is simple to construct, easy to operate, and which eliminates any eddy currents at the chamber side of the damper adjacent the entrance to the fuel inlet chamber even when the damper is moved almost to its closing position. Such results are secured by the use of a sliding damper having a curvature corresponding to the curvature of the inner wall of the fuel supply conduit and movable to a throttling position in which in effect it acts as an extension of said inner wall.

The various features of novelty which characterize my invention are pointed out with particularity in the claims annexed to and forming a part of this specification. For a better understanding of the invention, its operating advantages and specific objects attained by its use, reefrence should be had to the accompanying drawings and descriptive matter in which I have illustrated and described a preferred embodiment of my invention.

Of the drawings:

Fig. 2 is a vertical section taken on the line 2—2 of Fig. 3;

Fig. 3 is a vertical section taken on the line 3—3 of Fig. 2; and

Fig. 4 is a section taken on the line 4—4 of Fig. 3.

Figure 1:
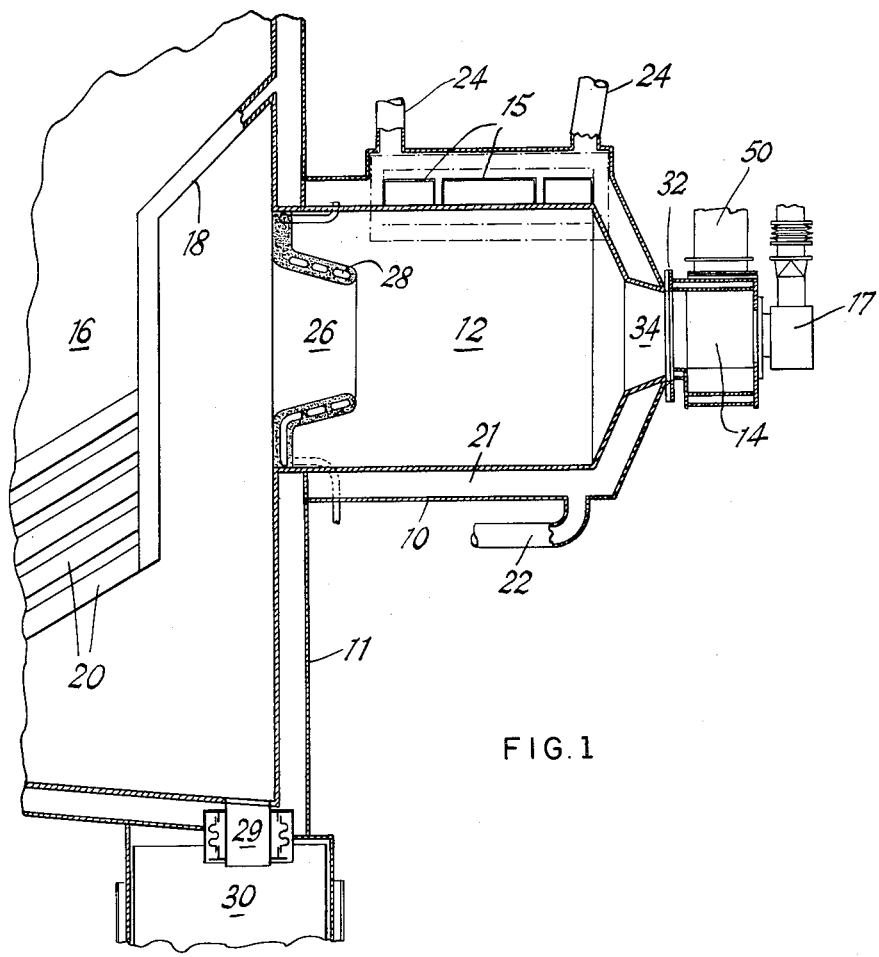
Fig. 1 is a partly diagrammatic sectional elevation of a cyclone furnace and steam boiler unit having a fuel inlet section embodying my invention.

As shown in Fig. 1, the cyclone furnace 10 is an integral part of a steam generating unit 11 and of the general character illustrated in said U. S. Patent 2,594,312. The furnace is fired with a crushed or granular fuel, such as bituminous or semi-bituminous coal, which is delivered thereto in a whirling stream of preheated primary or carrier air from a fuel inlet chamber 14. Preheated air at high velocity is supplied to the furnace chamber through tangentially arranged secondary air inlets 15 extending along the length of the chamber. A whirling stream of tertiary air may also be supplied to the fuel inlet chamber 14 from a tertiary air chamber 17 discharging axially thereof. The products of combustion from the cyclone furnace chamber 12 flow into an adjoining secondary furnace chamber 16 in which refractory covered steam genertaing tubes form a reflecting arch 18 and a slag screen 20, with which the products of combustion successively contact. The furnace chamber 12 is of circular cross-section throughout its length and defined by an annular water jacket 21 having a water inlet 22 and outlets 24 which can be connected into the fluid circulation system of the associated steam generating unit. A re-entrant fluid cooled throat 26 is defined by a helical inwardly flaring tube coil 28 to connect the cyclone furnace chamber with the secondary furnace chamber 16. An opening (not shown) is provided below the throat 26 to permit liquid slag to drain from the chamber 12 into the secondary furnace chamber, from which it passes through a slag outlet 29 into a slag pit 30.

In accordance with the present invention, the fuel inlet section of the cyclone furnace unit is specially constructed to regulably maintain a high velocity discharge of the whirling stream of granular fuel and air into the furnace chamber 12 over a wide load range without undue wear on the fuel directing parts and with a minimum pressure drop through this section of the unit. The fuel inlet chamber 14 is shown as of circular cross-section and arranged substantially coaxial with the furnace chamber 12. The chamber 14 has a slight inward flare, with its inner end having a flange connection 32 with a frusto-conical outer end section 34 of the furnace chamber 12. The fuel inlet chamber 14 is defined by a circular plate 36 forming the peripheral wall of the chamber except for a rectangular shaped segmental fuel inlet opening 38 adjacent the bottom of the chamber. A concentric plate 39 unites with the plate 36 and side plates to form a cooling jacket for the chamber 14, suitable cooling fluid inlet and outlet connections being supplied. The outer side of the chamber 14 is closed by a plate 40 having an ellipsoidal shaped opening 41 centrally therein, through which a whirling stream of tertiary air enters from the tertiary air chamber 17.

The inlet 38 of the fuel inlet chamber is connected to a suitable source of granular fuel and high pressure primary air, such as a forced draft fan, through a fuel supply conduit 50. As indicated in Figs. 2 and 3, the lower end of the conduit 50 is of rectangular internal cross-section, being formed by parallel vertical side plates 52 and 54, the latter being an extension of the plate 40, and a pair of converging concavely curved plates 56 and 58 forming the inner and outer walls respectively of the conduit 50. The plate 58 is of constant radius with its lower end merging into and welded to the lower edge of the circular plate 36. The lower end of the inner wall plate 56 terminates slightly above and beyond the opposite end of the circular plate 36, leaving a narrow passage 60 therebetween. With this arrangement, the stream of primary air and granular fuel flows down the conduit 50 at a progressively increasing velocity and enters the fuel inlet chamber 14 through the inlet 38, the velocity of the stream and uninterrupted curvature of the plates 58 and 36 causing it to remain in close contact with the peripheral wall of the chamber 14 until discharged from the inner end thereof.

In operation the effective flow area of the discharge end of the conduit 50, and thereby the velocity of the primary air-fuel stream entering the fuel inlet chamber 14 is controlled by a manually operated control damper 62. As shown, the control damper 62 has a curvature corresponding to that of the plate 56 and is arranged in sliding contact with the outer side thereof. The damper plate is movable along an arc of the same curvature, as shown in broken lines in Fig. 3, downwardly through the slot 60 into the inlet opening 38 to reduce the height of that opening and thereby its effective flow area. The damper plate is guided during its movement by side guide bars 64 having lugs 66 welded to extensions of the conduit side plates 52 and 54. The damper plate is moved in its arcuate path through a pair of spaced lugs 68 on the outer side thereof pivotally connected through links 70 and 72 to a rotatably mounted pipe 74, to which the links 72 are welded, and which is moved by an external operating lever 76.

With the described arrangement, the combustible mixture of primary air and fuel flows downwardly through the fuel supply conduit 50 in a progressively converging flow path of constant width and enters the fuel inlet chamber 14 adjacent the bottom thereof. The velocity of the entering fuel-air mixture is controlled, without affecting the position of the fuel-air stream relative to the peripheral wall of the chamber 14, by the position of the sliding curved damper 62 relative to the plate 58. This damper construction and movement insures that the lower end of the damper will follow essentially the spiral contour of the fuel supply passage 50, i. e. the primary air and fuel stream will be guided directly into the chamber 14 and no eddy currents can develop at the chamber side of the damper, since the damper plate also conforms substantially to the curvature of the chamber peripheral wall 36.

While in accordance with the provisions of the statutes I have illustrated and described herein the best form of the invention now known to me, those skilled in the art will understand that changes may be made in the form of the apparatus disclosed without departing from the spirit of the invention covered by my claims, and that certain features of my invention may sometimes be used to advantage without a corresponding use of other features.

I claim:

1. Fuel burning apparatus comprising means defining a furnace chamber, a fuel inlet chamber communicating with said furnace chamber and having a curved wall forming substantially the entire peripheral wall thereof, means for supplying a combustible mixture substantially tangentially to the peripheral wall of said fuel inlet chamber comprising a fuel supply conduit having curved converging plates forming the inner and outer walls thereof, and a slidably mounted damper having a curvature corresponding to the curvature of said conduit inner wall and movable therealong in closing relationship to said outer wall to a position forming an extension of the chamber end of said inner wall in the curvilinear plane thereof.

2. Fuel burning apparatus comprising means defining a furnace chamber, a fuel inlet chamber communicating with said furnace chamber and having a curved wall forming substantially the entire peripheral wall thereof, means for supplying a stream of primary air and solid fuel particles in suspension substantially tangentially to the peripheral wall of said fuel inlet chamber comprising a fuel supply conduit having curved converging plates forming the inner and outer walls thereof, said outer conduit wall forming a continuation of the peripheral wall of said fuel inlet chamber, and a slidably mounted damper having a curvature corresponding to the curvature of said conduit inner wall and movable therealong in closing relationship to said outer wall to a position forming an extension of the chamber end of said inner wall in the curvilinear plane thereof.

3. Fuel burning apparatus comprising means defining a furnace chamber, a fuel inlet chamber communicating with said furnace chamber and having a curved wall forming substantially the entire peripheral wall thereof, means for supplying a stream of primary air and solid fuel particles in suspension substantially tangentially to the peripheral wall of said fuel inlet chamber comprising a fuel supply conduit having curved converging plates respectively forming the inner and the outer wall thereof, said outer conduit wall forming a continuation of the peripheral wall of said fuel inlet chamber, and a slidably mounted damper at the inner concave side of said conduit inner wall and having a curvature corresponding to the curvature of said conduit inner wall and movable therealong in closing relationship to said outer wall to a position forming an extension of the chamber end of said inner wall in the curvilinear plane thereof.

4. Fuel burning apparatus comprising means defining a furnace chamber of circular cross-section and having a fuel inlet opening at one end thereof and a gas outlet opening in the opposite end thereof, a fuel inlet chamber communicating with said fuel inlet opening and having a curved wall forming substantially the entire peripheral wall thereof, means for supplying a stream of primary air and solid fuel particles in suspension to said fuel inlet chamber comprising a fuel supply conduit having curved converging plates respectively forming the inner and the outer wall thereof, said outer conduit wall forming a continuation of the peripheral wall of said fuel inlet chamber, and a curved damper slidably mounted at the inner concave side of said conduit inner wall and having a curvature corresponding to the curvature of said inner wall and movable therealong in closing relationship to said outer wall to a position forming an extension of the chamber end of said inner wall in the curvilinear plane thereof.

5. Fuel burning apparatus comprising means defining a furnace chamber of circular cross-section and having a fuel inlet opening at one end and a gas outlet opening at the opposite end thereof, a fuel inlet chamber communicating with said fuel inlet opening and having a substantially circular wall forming substantially the entire peripheral wall thereof, means for supplying a stream of primary air and solid fuel particles in suspension substantially tangentially to said fuel inlet chamber comprising a fuel supply conduit having curved converging plates respectively forming the inner and outer walls thereof, said outer conduit wall forming a continuation of the peripheral wall of said fuel inlet chamber, said inner conduit wall having its inner end laterally spaced from the corresponding end of said peripheral wall to form a gap therebetween, and a damper plate slidably mounted on said conduit inner wall and having a curvature corresponding to the curvature of said inner wall, said damper plate being movable along said inner wall and through said gap in closing relationship to said outer wall to a position forming an extension of the chamber end of said inner wall in the curvilinear plane thereof.

References Cited in the file of this patent

UNITED STATES PATENTS

| | | |
|---|---|---|
| 1,858,674 | Leask et al. | May 17, 1932 |
| 1,911,487 | Blatter | May 30, 1933 |
| 2,018,582 | Theunissen | Oct. 22, 1935 |
| 2,097,255 | Saha | Oct. 26, 1937 |
| 2,379,490 | Kruger | July 3, 1945 |

FOREIGN PATENTS

| | | |
|---|---|---|
| 466,831 | Germany | Oct. 12, 1928 |